United States Patent [19]

Sano et al.

[11] Patent Number: 5,694,510

[45] Date of Patent: Dec. 2, 1997

[54] TUB-AGGREGATED OPTICAL CABLE

[75] Inventors: Hiroaki Sano; Hiroki Ishikawa; Shigeru Tanaka, all of Kanagawa; Kazuo Hogari; Osamu Kawata, both of Ibaraki, all of Japan

[73] Assignees: Sumitomo Electric Industries, Ltd., Osaka; Nippon Telegraph and Telephone Corporation, Tokyo, both of Japan

[21] Appl. No.: 616,504

[22] Filed: Mar. 19, 1996

[30] Foreign Application Priority Data

Mar. 20, 1995 [JP] Japan .................. 7-060788

[51] Int. Cl.$^6$ .................................. G02B 6/44
[52] U.S. Cl. .................. 385/113; 385/103; 385/104; 385/109; 385/114; 174/70 A
[58] Field of Search .................. 385/100–114; 138/103, 110; 156/166, 158; 174/70 A

[56] References Cited

U.S. PATENT DOCUMENTS

| 5,043,037 | 8/1991 | Buckland | 385/109 X |
| 5,358,011 | 10/1994 | Stockton et al. | 385/109 X |
| 5,542,020 | 7/1996 | Horska | 385/113 X |

FOREIGN PATENT DOCUMENTS 2-72624  6/1990  Japan .

*Primary Examiner*—Phan T. H. Palmer
*Attorney, Agent, or Firm*—Cushman Darby & Cushman, IP Group of Pillsbury Madison & Sutro, LLP

[57] ABSTRACT

A tube sheet is formed by integrating a plurality of tubes into the form of a sheet. The tube sheet is constricted in junction portions of the respective tubes so that the tube sheet is deformed in these junction portions. At least one such tube sheet is disposed around a center member to form a tube-aggregated cable.

15 Claims, 6 Drawing Sheets

TUB-AGGREGATED OPTICAL CABLE

BACKGROUND OF THE INVENTION

1. Field of the Invention

The present invention relates to a tube-aggregated cable with a plurality of tubes into which optical fibers, cables, electric cables, and the like are inserted.

2. Description of the Related Art

FIGS. 12A and 12B are sectional views showing an example of a conventional tube-aggregated cable. In the drawings, the reference numeral 21 designates plastic pipes; 22, a sheath; 23, a hollow portion; and 24, a center member. In the tube-aggregated cable shown in FIG. 12A, a plurality of plastic pipes 21 are prepared, and a sheath 22 is extrusionmolded at a lower molding temperature than the melting point of these plastic pipes 21 to thereby form a pipe cable having a hollow portion 23. Such a tube-aggregated cable has been disclosed, for example, in Unexamined Japanese Utility Model Publication No. Hei-2-72624, and the like. Further, a tube-aggregated cable, as shown in FIG. 12A, which is configured by forming a flat pipe set by extrusion molding in the same manner as described above and joining the opposite ends of the flat pipe set to each other, has been disclosed also in the same publication. Further, as shown in FIG. 12B, a plurality of plastic pipes are disposed around the center member 24 and united by the sheath 22 to thereby form a tube-aggregated cable.

In such a tube-aggregated cable, the work of integrating the respective plastic pipes 21 by the sheath 22 is required after the respective plastic pipes 21 are produced. Therefore, not does only the production cost increase but also the producing work becomes complex.

For example, the tube aggregated cable is strung as an aerial cable. Thereafter, it may be necessary to branch or draw down an optical fiber, a cable, an electric cable, or the like in the way thereof from the tube-aggregated cable. In the branching or drawing-down work, it has to specify and take out the optical fiber, cable, electric cable, or the like, to be branched or drawn down at the branching or drawing-down point. In the case of a tube-aggregated cable as shown in FIGS. 12A and 12B, the optical fiber, cable, electric cable, or the like to be taken out cannot be specified from the outside. Furthermore, the work of removing the sheath 22 is required when the specified optical fiber, cable, electric cable, or the like, is to be taken out. Particularly, in the tube-aggregated cable shown in FIG. 12B, the work of taking out an optical fiber, cable, electric cable, or the like, from the inside by cutting off a specific tube selectively is difficult. For example, in the case of drawing-down work, drawing down to each building is required. If the drawing-down work is complex, the quantity of work as a whole increases. Consequently, there arises a problem that the increase of laying time, laying cost and cable cost, and the like, is occurs.

SUMMARY OF THE INVENTION

It is an object of the present invention to provide a tube-aggregated cable which is low in cost and easy in performing the work of branching, drawing down, an the like.

A tube-aggregated cable of the present invention is comprised of a center member; and at least one tube sheet comprising a plurality of tubes being integrated into the form of a sheet, the tube sheet being disposed on the circumference of the center member; wherein the tube sheet is constricted in junction portions of the respective tubes.

According to the invention, a plurality of tubes are formed so as to be united into the form of a sheet, so that the plurality of tubes can be produced simultaneously to thereby reduce the production cost of the tubes. Further, the respective tubes of the tube sheet are aggregated so as to be disposed around the center member to thereby form a cable. Because, in this occasion, one tube sheet constituted by a plurality of tubes can be provided from one supply, the number of supplies can be reduced so that the production cost can further be reduced. Further, in the case where such a tube-aggregated cable is laid, a stable shape can be kept without separation of the pipes from each other because the respective tubes are joined in the form of a sheet. Further, there is no sheath required to be provided around the tube sheet. In the case where no sheath is provided, a target tube can be taken out directly to operate branching or drawing-down work. In this occasion, there is no complex work required for removing the sheath, or the like, so that the workability can be improved.

PREFERRED EMBODIMENTS OF THE INVENTION

Figure 1A:
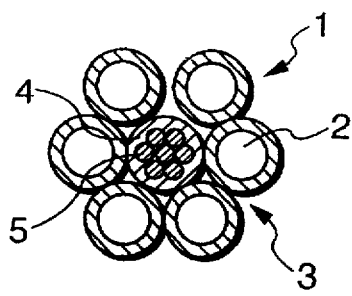
FIGS. 1A and 1B are sectional views showing a first embodiment of a tube-aggregated cable according to the present invention.
Figure 1B:
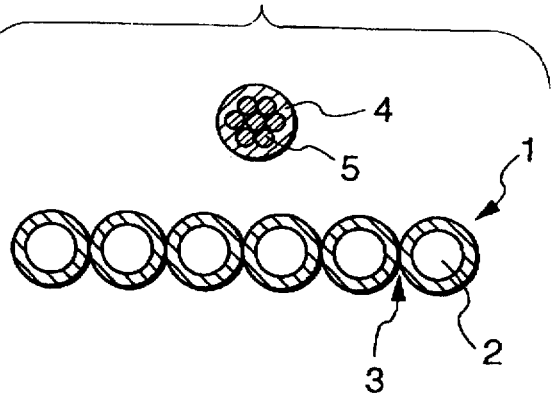

FIGS. 1A and 1B are sectional views showing a first embodiment of a tube-aggregated cable according to the present invention. In the drawings, the reference numeral 1 designates a tube sheet; 2, tubes; 3, junction portions; 4, a center member; and 5, tensile strength wires. As shown in FIG. 1B, the tube sheet 1 is shaped by uniting a plurality of tubes 2 into the form of a sheet. In the junction portions 3 of the respective tubes 2, the tube sheet 1 is constricted so as to be able to be more or less deformed in these portions. Therefore, as shown in FIG. 1B, the tube sheet can be disposed around the center member 4 even in the case where the tube sheet is molded in the form of a plate. Various materials having an elasticity are used to form the tube sheet. However, it is preferable to use a material having a sufficient elasticity to be disposed around the center member 4 as shown in FIG. 1A. For example, polyethylene, polypropylene, or the like may be used for the tube sheet 1.

FIG. 1A shows a tube-aggregated cable formed by disposing the tube sheet 1 shown in FIG. 1B so as to contact with the center member 4. In this manner, a tube-aggregated cable can be produced easily only by disposing the tube sheet 1 to contact with the circumference of the center member 4. In this occasion, the tubes 2 do not separate from one another because the respective tubes 2 are molded integrally with each other to be into the tube sheet 1. In the configuration of the tube-aggregated cable shown in FIG. 1A, tensile strength wires 5 are disposed in the inside of the center member 4 to secure the total strength of the tube-aggregated cable. When the cable is to be strung, the cable can be arrested on a telegraph pole, or the like, by using the tensile strength wires 5. Of course, a conduit wire, another cable, or the like may be used.

Figure 1C:
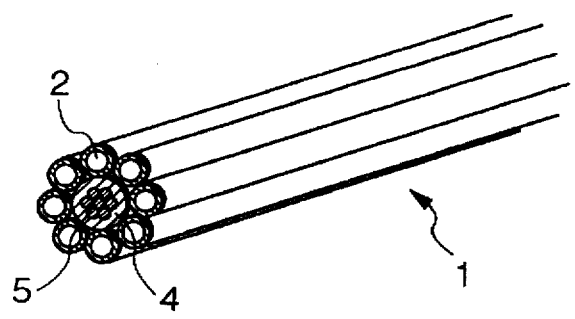
FIGS. 1C and 1D are perspective views showing the first embodiment of the tube-aggregated cable.
Figure 1D:
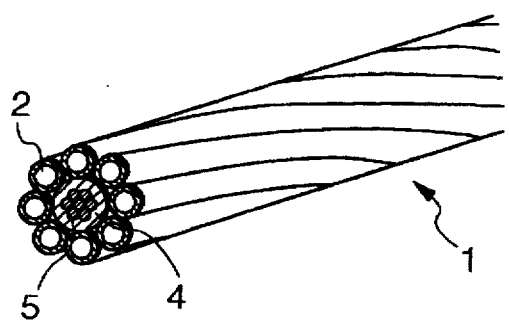

In such a configuration, the tube sheet may be spirally wound on the center member 4 longitudinally as one method when the tube sheet 1 is aggregated on the center member 4 as shown in FIG. 1D. In such a configuration, in the tube-aggregated cable, the tube sheet 1 and the center member 4 are not separated from each other.

As another method, respective tubes 2 of the tube sheet 1 can be aggregated around the center member 4 so as to be substantially longitudinally parallel to the center member 4 as shown in FIG. 1C. In this case, the positions of the respective tubes 2 on the circumference of the center member 4 do not change regardless of the position of the tube-aggregated cable. Accordingly, after this tube-aggregated cable is laid, for example, a tube required at the time of branching or drawing out is specified easily so that the workability can be improved. It is, however, thought of that the tube sheet 1 may be separated from the center member 4 in the case where the tube sheet 1 is merely disposed around the center member 4 in parallel to the center member 4. In order to avoid this trouble, binding members may be wound on the tube-aggregated cable intermittently so that the tube sheet 1 is fixed to the cable. Alternatively, the tube sheet 1 may be adhered on the center member 4 by an adhesive agent.

When such a tube-aggregated cable is to be produced, the tube sheet 1 is first produced and then the tube sheet 1 is disposed around the center member 4. Because the tube sheet 1 can be formed as one body, a plurality of tubes are prepared at once at the time of production. Therefore, the production cost of the tubes can be reduced. Further, because the center member 4 and the tube sheet 1 can be aggregated if at least one tube sheet 1 and a center member 4 are provided, the producing apparatus not only can be simplified but also can be produced at low cost in comparison with the conventional case where a plurality of tubes must be provided individually. Further, because no cage for winding spirally is required when the respective tubes 2 are aggregated so as to be longitudinally parallel to the center member 4, tandem production can be made. In this manner, not only the tube-aggregated cable according to the present invention can be produced easily throughout the producing process but also the production cost can be reduced.

Figure 2A:
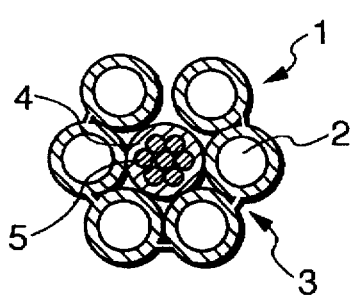
FIGS. 2A and 2B are sectional views showing a second embodiment of the tube-aggregated cable.
Figure 2B:
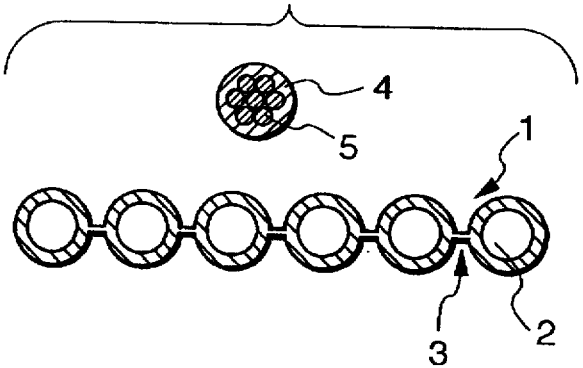

FIGS. 2A and 2B are sectional views showing a second embodiment of the tube-aggregated cable according to the present invention. In the drawings, numerals the same as those in FIGS. 1A and 1B refer to the same parts. In this embodiment, the junction portions 3 between the respective tubes 2 are made long. Accordingly, the flexibility of the tube sheet 1 is improved so that the tube sheet 1 can be aggregated easily around the center member 4. Furthermore, after the aggregation, the close contact property of the tube sheet 1 is improved.

Figure 3A:
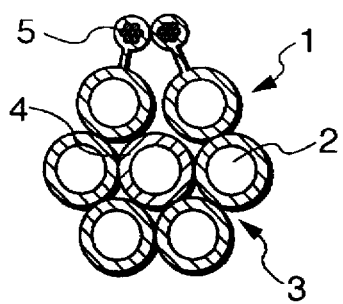
FIGS. 3A and 3B are sectional views showing a third embodiment of the tube-aggregated cable.
Figure 3B:
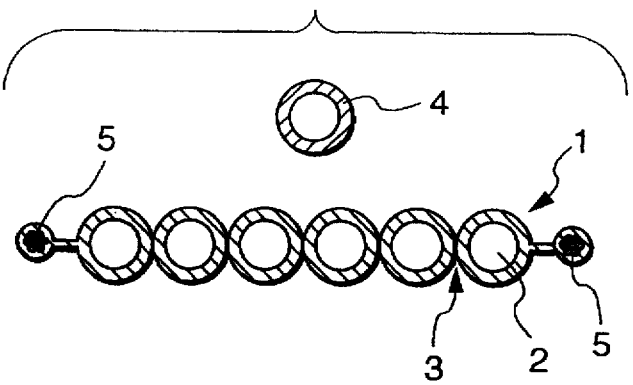

FIGS. 3A and 3B are sectional views showing a third embodiment of the tube-aggregated cable according to the present invention. In the drawings, numerals the same as those in FIG. 1 refer to the same parts. In this embodiment, tensile strength wires 5 are disposed on the opposite ends of the tube sheet 1. Such a tube sheet 1 is disposed so as to enclose the center member 4 therein. The tensile strength wires 5 on the opposite ends of the tube sheet 1 not only secure the total strength of the tube-aggregated cable in the same manner as in the first embodiment but also function as suspension wires at the time of stringing so as to support the tube-aggregated cable. Furthermore, the tensile strength wires 5 serve to tighten the tube sheet 1 at the time of stringing to thereby stabilize the structure of the tube-aggregated cable.

In the third embodiment, there is no tensile strength wire 5 provided in the center member 4 because tensile strength wires 5 are disposed on the opposite ends of the tube sheet 1. In this embodiment, the center member 4 is constituted by a conduit cable. Optical fibers, cables, electric cables, etc. can be made to pass through this conduit cable. As the conduit cable, there may be used only one tube or a tube sheet which is formed by uniting by a number (from about two to about four) of tubes as explained above in FIGS. 1A to 2B. Of course, the conduit wire may be constituted by other cables, or the like, or tensile strength wires 5 may be provided in the conduit wire in the same manner as in the first embodiment.

Figure 4:
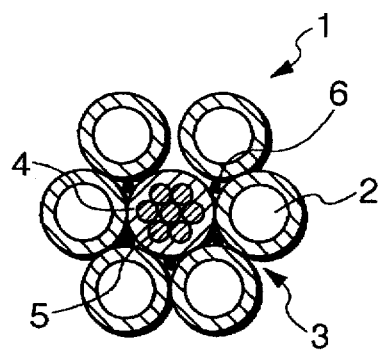
FIG. 4 is a sectional view showing a fourth embodiment of the tube-aggregated cable.
Figure 5:
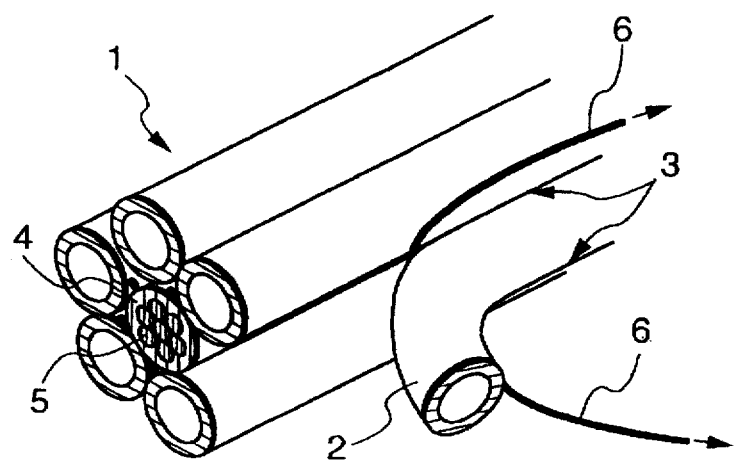
FIG. 5 is a view for explaining use of tear cords.

FIG. 4 is a sectional view showing a fourth embodiment of the tube-aggregated cable according to the present invention, and FIG. 5 is a view for explaining use of tear cords. In the drawings, parts the same as those in FIG. 1 are referenced correspondingly and the description about those parts is omitted here. The reference numeral 6 designates tear cords. In this embodiment, five tear cords 6 are provided between the center member 4 and the junction portions 3 of the tube-sheet 1, respectively. The tear cords 6 are used for separating the tubes 2 at the junction portions 3 of the tube sheet 1. When a desired tube 2 is to be taken out in the branching, drawing out, or the like, it is necessary to separate the desired tube 2 from the tube sheet 1. When the desired tube 2 is located in the middle of the tube sheet 1, the junction portions 3 on the opposite sides of the desired tube 2 are partially broken and the tear cords 6 are taken out of the cable and pulled as shown in FIG. 5 so that the desired tube 2 can be separated from the tube sheet 1 longitudinally and taken out from the tube sheet 1.

Figure 6:
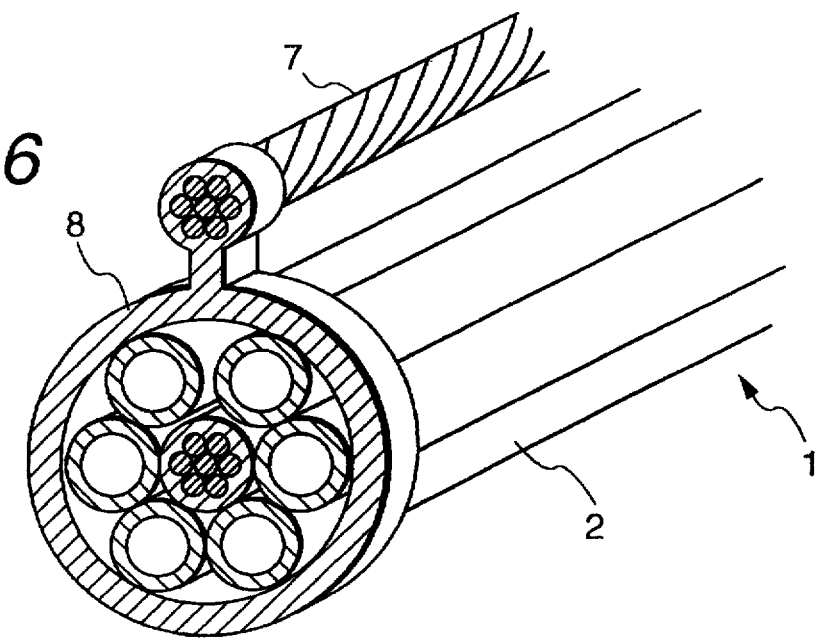
FIG. 6 is a sectional perspective view showing a fifth embodiment of the tube-aggregated cable.

FIG. 6 is a sectional perspective view showing a fifth embodiment of the tube-aggregated cable according to the present invention. In the drawing, parts the same as those in FIG. 1 are referenced correspondingly and description about those parts is omitted here. The reference numeral 7 designates a suspension wire; and 8, binding members. In the fifth embodiment, there is shown an example in which the suspension wire 7 is used. The suspension wire 7 is constituted by tensile strength wires, or the like. In FIG. 6, the tube-aggregated cable shown in FIG. 1 is disposed along the suspension wire 7 and aggregated by the binding members 8 discretely. For example, the binding members 8 can be formed by molding, or the like, at the time of production of the cable. The binding members 8 are provided at intervals of a distance, for example, of from about 50 to about 70 cm, and the width of each of the binding members 8 may be selected to be about 8 mm.

In the fifth embodiment, the suspension wire 7 is fixed to a telegraph pole, or the like, at the time of stringing. In this occasion, no excessive force acts on the tube sheet 1 because tension only acts on the suspension wire 7. In this tube-aggregated cable, the respective tubes 2 are not covered with any sheath, so that direct work can be made directly from the outside except the portions bound by the suspension wire 7 and the binding members 8. The center member 4 preferably has stiffness sufficient to support the tube sheet 1 does not that the tube sheet 1 does not hang down in sections between the binding members 8. Therefore, FIG. 6 shows the configuration in which tensile strength wires 5 are disposed in the center member 4. Not only tensile strength wires 5 but also various kinds of cables or conduit wires can be also used as the center member 4. Further, the tube sheet as shown in FIG. 2 may be used or the structure in which tear cords are provided may be used as shown in FIG. 4.

Figure 7:
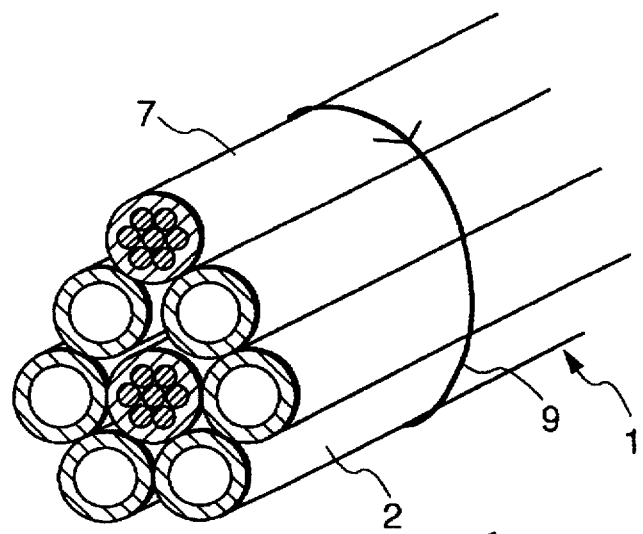
FIG. 7 is a sectional perspective view showing a sixth, seventh and eighth embodiment of the tube-aggregated cable.

FIG. 7 is a sectional perspective view showing a sixth embodiment of the tube-aggregated cable according to the present invention. In the drawing, parts the same as those in FIG. 6 are referenced correspondingly, and description is omitted here. The reference numeral 9 designates binding cords. In the sixth embodiment, there is shown the configuration in which the binding cords 9 are used as the binding members 8 in the fifth embodiment. The cable and the suspension wire 7 as shown in FIGS. 1, 2 and 4 are bound by the binding cords 9 intermittently so as to be united into one body. In this structure, besides binding at the time of production of the cable, the suspension wire 7 may be used for stringing the cable as shown in FIGS. 1, 2 and 4 and the cable and the suspension wire 7 may be also bound by the binding cords 9 at the time of stringing. Further, when tubes 2 are to be separated over the binding interval of the binding cords 9, the tubes 2 may be separated by cutting off some binding cords 9 and then may be bound by the binding cords 9 again.

Figure 8:
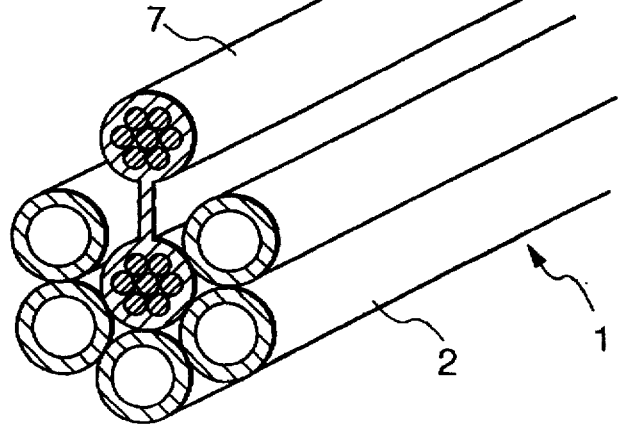
FIG. 8 is a sectional perspective view showing a ninth embodiment of the tube-aggregated cable.

FIG. 8 is a sectional perspective view showing a seventh embodiment of the tube-aggregated cable according to the present invention. In the drawing, numerals the same as those in FIG. 6 refer to the same parts. In this embodiment, there is shown the structure in which the suspension wire 7 and the center member 4 are united into one body. The respective tubes 2 of the tube sheet 1 aggregated around the center member 4 are disposed so as to be longitudinally parallel to the center member 4 and the suspension wire 7, so that there is no change of the relative positions of the suspension wire 7 and the respective tubes 2. Accordingly, a desired tube 2 can be specified easily, for example, at the time of branching work or drawing-out work, so that the workability can be improved. Incidentally, binding members as shown in FIGS. 6 and 7 may be also used intermittently for making the center member 4 support the tube sheet 1.

In addition, the structure of the center member 4 may be different from that of the suspension wire 7. For example, the center member may be the conduit cable. Accordingly, not only tensile strength wires 5 but also various kinds of cables or conduit wires can be also used as the center member 4.

Figure 15A:
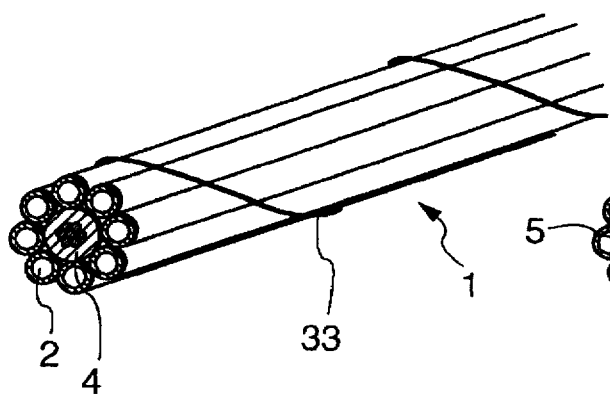
FIG. 15A and 15B are sectional perspective views showing an example in which a bind line is wound around the tube sheet.
Figure 15B:
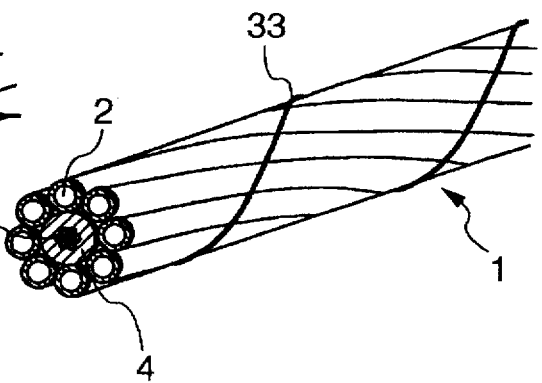

FIG. 15A is a sectional perspective view showing a eighth embodiment of the tube-aggregated cable according to the present invention. In the drawing, numerals the same as those in FIGS. 1A and 1B refer to the same parts. In this embodiment, a bind line 33 is spirally wound around the tube sheet 1. Incidentally, in this embodiment, the tube sheet 1 is disposed around the center member 4 to be longitudinally parallel. However, the tube sheet 1 may be disposed around the center member 4 to be longitudinally spiral as shown in FIG. 15B. In this case, it is preferable that the spiral direction of the bind line 33 is opposite to that of the tube sheet 1 in view of the fixing of the tube sheet 1.

Figure 16:
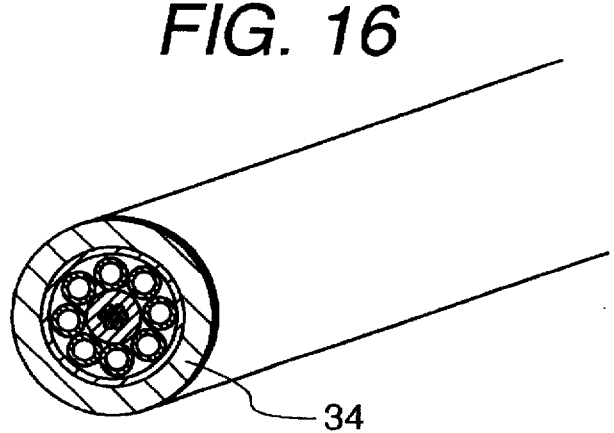
FIG. 16 is a sectional perspective view showing an example in which a sheath is disposed around the tube sheet.

FIG. 16 is a sectional perspective view showing a ninth embodiment of the tube-aggregated cable according to the present invention. In the drawing, numerals the same as those in FIGS. 1A and 1B refer to the same parts. In this embodiment, a sheath 34 is disposed around the tube sheet 1.

Figure 13:
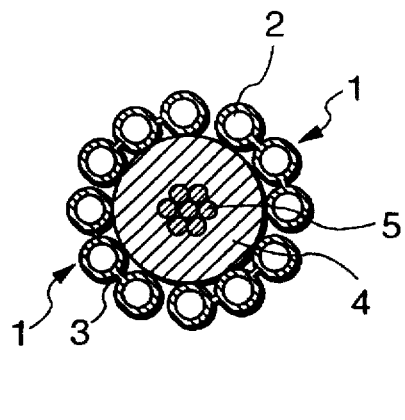
FIG. 13 is a sectional view showing an example in which a plurality of tube sheets are disposed around the center member.
Figure 14:
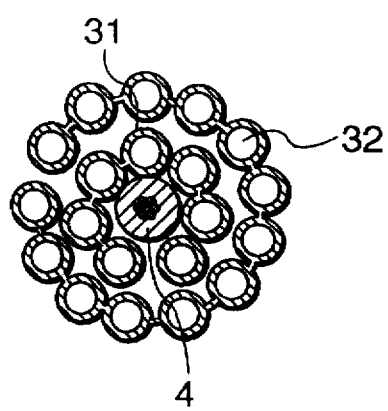
FIG. 14 is a sectional view showing an example in which tube sheets are disposed in two layers around the center member.

Although the tube-aggregated cable illustrated in the aforementioned embodiments has been described upon the case where one tube sheet 1 is disposed around the center member 4, the present invention is not limited thereto but may be configured so that a plurality of tube sheets are disposed around the center member. When, for example, the number of tubes constituting the tube sheet 1 is 3 or 4, it is easy to produce the tube sheet. If twelve tubes are to be disposed around the center member, it is preferable that four tube sheets each constituted by integrating three tubes are disposed around the center member as shown in FIG. 13. Although the aforementioned embodiments have shown the case where a tube sheet is disposed in a single layer around the center member, tube sheets may be disposed in two or more layers around the center member as shown in FIG. 14. In FIG. 14, a first tube sheet 31 having seven tubes is disposed around the center member 4, and further a second tube sheet 32 having thirteen tubes is disposed around the first tube sheet 31.

Figure 9:
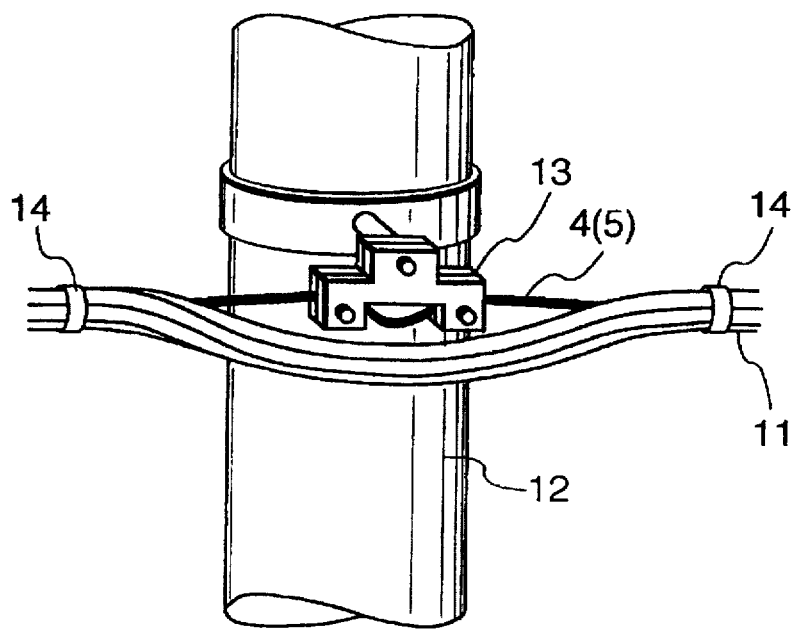
FIG. 9 is a view for explaining an example of the state where the tube-aggregated cable according to the present invention is arrested on a telegraph pole when the cable is to be strung.
Figure 10:
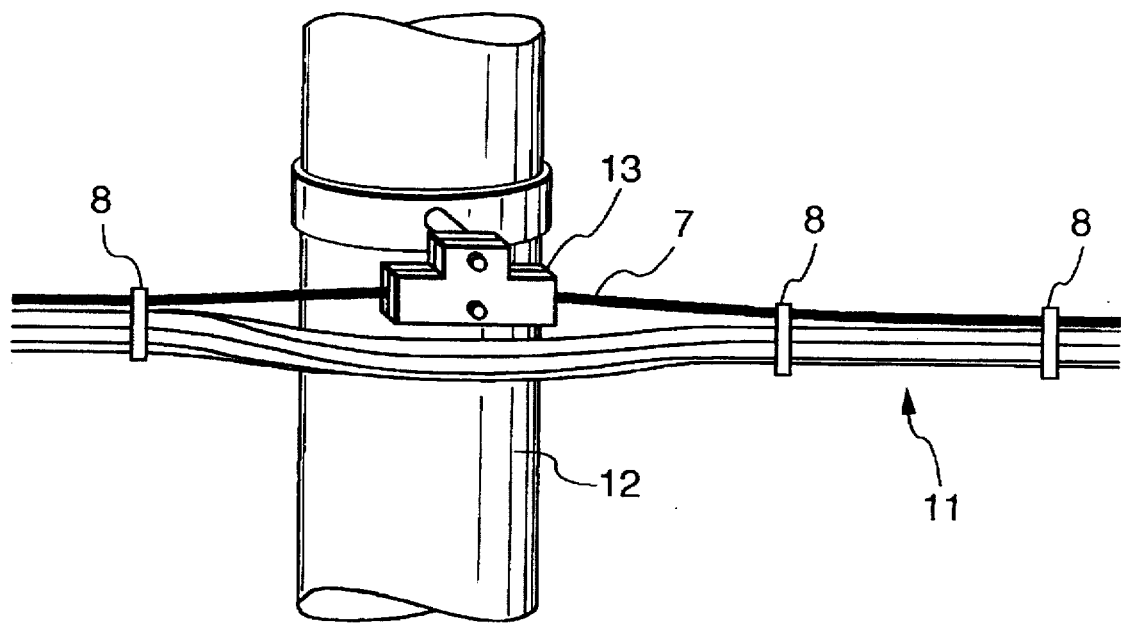
FIG. 10 is a view for explaining another example of the state where the tube-aggregated cable according to the present invention is arrested on a telegraph pole when the cable is to be strung.

FIGS. 9 and 10 are views for explaining examples of the state in which the tube-aggregated cable according to the present invention is arrested on a telegraph pole at the time of stringing. In the drawings, the reference numeral 11 designates a tube-aggregated cable; 12, a telegraph pole; 13, an arresting fitting; and 14, rings. FIG. 9 shows the state in which the tube-aggregated cable 11 having no suspension wire as shown in FIGS. 1, 2 and 4 is arrested on the telegraph pole 12. At the time of arresting the tube-aggregated cable 11, the center member 4 having tensile strength wires 5 is taken out of the tube-aggregated cable 11 and arrested by the arresting fitting 13 provided on the telegraph pole 12. At the arresting point, the center member 4 and the tube sheet 1 are separated from each other, so that the tube-aggregated cable 11 is deformed. On the opposite sides of the arresting point, however, rings may be attached on the tube-aggregated cable 11 so that the tube sheet 1 is not separated any more.

FIG. 10 shows the state in which the tube-aggregated cable 11 having a suspension wire 7 as shown in FIGS. 3, 6, 7 and 8 is arrested on the telegraph pole 12. In FIG. 10, there is shown an example of the arresting state of the tube-aggregated cable 11 shown in FIG. 6. In this case, the suspension wire 7 is only arrested by the arresting fitting 13 provided on the telegraph pole 12. Accordingly, the arresting work can be made easily.

Figure 11:
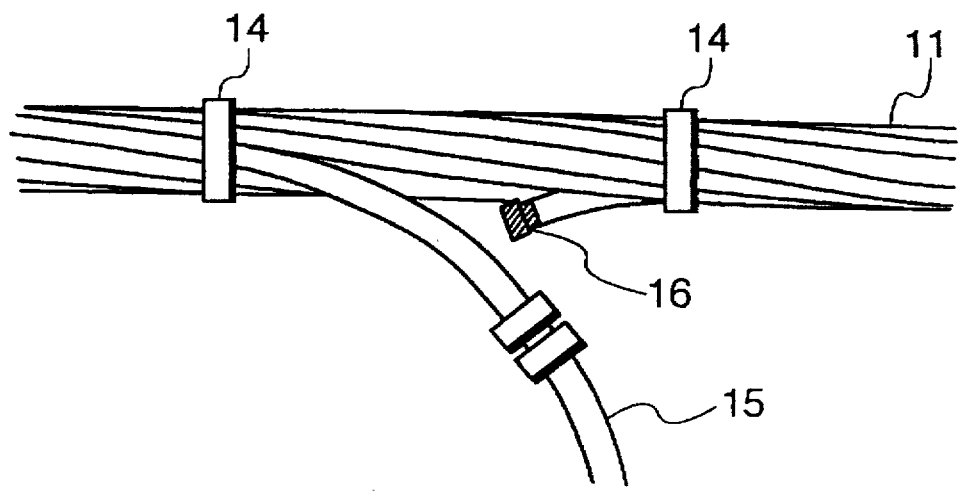
FIG. 11 is a view for explaining an example of the work for branching the tube-aggregated cable according to the present invention.
Figure 12A:
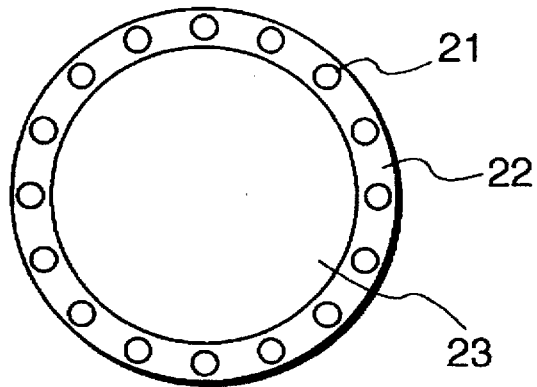
FIG. 12A and 12B are sectional views showing an example of a conventional tube-aggregated cable.
Figure 12B:
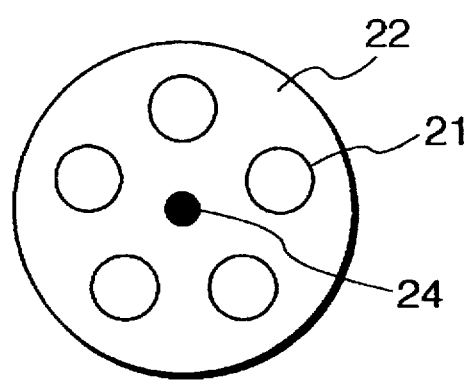

FIG. 11 is a view for explaining an example of the work for branching the tube-aggregated cable according to the present invention. In the drawing, parts the same as those in FIG. 9 are referenced correspondingly and the description about them is omitted here. The reference numeral 15 designates a tube; and 16, an open end seal. At the time of the branching work, a tube to be branched is first specified from the tubes in the tube sheet of the tube-aggregated cable 11. In this occasion, since the respective tubes are observable in the tube-aggregated cable according to the present invention, the tube to be branched can be specified easily. The tube to be branched is joined to other tubes through the junction portions 3 in the tube sheet. Therefore, the junction portions on the opposite sides of the tube to be branched at the branching point are torn so that the tube to be branched is taken out. The sheath removing work, or the like, required conventionally is not required. Then, the tube is cut off at a suitable position and connected to another tube 15. The residual cut-end portion of the tube is sealed by the open end seal 16, or the like, so that water, or the like, does not enter the inside of the tube. Further, rings 14 may be preferably attached on the opposite sides of the branching point so that tearing for taking out the tube to be branched is prevented from progressing. When the tube-aggregated cable according to the present invention is used as described above, the tube to be branched can be specified easily and the specified tube can be directly taken out, cut off and connected to another new tube. Accordingly, the workability can be improved greatly in comparison with the conventional cable.

At the time of the drawing-down work, the tube is cut off at a position opposite to an exchange station from a drawing-down point by the distance required from the drawing-down point to a house and the junction portions of the tube sheet are torn up to the drawing-down point. In this occasion, there is no sheath for covering the tubes in the tube-aggregated cable according to the present invention, so that a desired tube can be separated by a desired length only by tearing the junction portions. If the tube thus obtained is directly drawn to the house, the drawing-down work can be performed without connecting work, or the like, at the drawing-down point.

As apparent from the above description, according to the present invention, respective tubes of the tube sheet do not separate because the tubes are integrated once in the form of a tape, and the cost for aggregating the tubes can be reduced because the plurality of tubes as a cable can be provided from one supply in the form of a tape. Furthermore, the production cost of the tubes can be reduced because the plurality of tubes can be produced simultaneously. Furthermore, the workability can be improved because there is no sheath so that branching work or drawing-down work can be carried out by specifying a tube directly without sheath removing work when the branching or drawing-down work is required after stringing.

In the configuration in which respective tubes of the tube sheet are disposed so as to be substantially longitudinally parallel to the center member, there is no need for any cage to wind the tube sheet longitudinally spirally at the time of production, so that the tube sheet can be produced by a low-cost producing equipment. Further, the production of the tube sheet and the tandem production of a set of the tube sheet and the center member can be made. Furthermore, at the time of stringing, the positions of respective tubes are fixed, so that a target tube can be specified easily, for example, at the time of the branching or drawing-down work and that the workability can be improved.

Further, in the configuration in which tensile strength wires are provided on the opposite ends of the tube sheet so as to be integrated with the tube sheet, the security of the total strength of the tube-aggregated cable and the stability of the structure thereof can be attained by the tensile strength wires. Further, the positions of the respective tubes relative to the tensile strength wires are constant, so that the target tube can be specified easily at the branching or drawing-down work and that the workability can be improved.

In the configuration in which tear cords are provided, the junction portions between tubes can be torn only by taking out and pulling the tear cords, so that the target tube can be taken out easily.

Also in the configuration in which a suspension wire is provided, since tubes are fixed only by fixing members discretely without use of any sheath, a target tube can be specified and taken out easily. There arise effects, for example, that the workability can be improved in the branching or drawing-down work after stringing, and the like.

What is claimed is:

1. A tube-aggregated cable comprising:
   a center member; and
   at least one tube sheet comprising a plurality of tubes being integrated into the form of a sheet, tubes of said tube sheet being joined so that said tube sheet is deformable at junction portions of the respective tubes, said tube sheet being disposed about the circumference of said center member.

2. A tube-aggregated cable according to claim 1, further comprising a suspension wire, and a fixing member for fixing said suspension wire to said tube sheet.

3. A tube-aggregated cable according to claim 2, wherein said tube sheet is fixed to said suspension wire by said fixing member longitudinally and discretely.

4. A tube-aggregated cable according to claim 2, wherein said suspension wire is integrated with said center member.

5. A tube-aggregated cable according to claim 1, further comprising tensile strength wires being integrated with said tube sheet at the opposite ends thereof.

6. A tube-aggregated cable according to claim 5, wherein said center member is comprised of a conduit cable.

7. A tube-aggregated cable according to claim 1, wherein a plurality of said tube sheets are disposed around the circumference of said center member.

8. A tube-aggregated cable according to claim 1, wherein the respective tubes of said tube sheet are disposed to be substantially longitudinally parallel to said center member.

9. A tube-aggregated cable according to claim 1, further comprising tear cords being provided between said center member and each of junction portions of the respective adjacent tubes of said tube sheet disposed around said center member.

10. A tube-aggregated cable according to claim 1, further comprising a bind line which is spirally wound around said tube sheet.

11. A tube-aggregated cable according to claim 1, further comprising a bind line which is spirally wound around said tube sheet, wherein a spiral direction of said bind line is opposite to that of said tube sheet.

12. A tube-aggregated cable according to claim 1, further comprising a sheath is disposed around said tube sheet.

13. A tube-aggregated cable according to claim 1, wherein said center member is comprised of a tensile member.

14. A tube-aggregated cable according to claim 1, wherein said center member is comprised of a conduit cable.

15. A tube-aggregated cable comprising:

a center member; and at least one tube sheet comprising a plurality of tubes being integrated into the form of a sheet, tubes of said tube sheet being joined so that said tube sheet is deformable at junction portions of the respective tubes, said tube sheet being spirally disposed about the circumference of said center member.

* * * * *